(12) United States Patent
Zhang et al.

(10) Patent No.: US 12,057,610 B2
(45) Date of Patent: Aug. 6, 2024

(54) MEMBRANE ELECTRODE WITH ULTRA-LOW OXYGEN MASS TRANSFER RESISTANCE

(71) Applicant: SHANGHAI JIAO TONG UNIVERSITY, Shanghai (CN)

(72) Inventors: Junliang Zhang, Shanghai (CN); Yutong Liu, Shanghai (CN); Guanghua Wei, Shanghai (CN); Chao Wang, Shanghai (CN); Xiaojing Cheng, Shanghai (CN)

(73) Assignee: SHANGHAI JIAO TONG UNIVERSITY, Shanghai (CN)

(*) Notice: Subject to any disclaimer, the term of this patent is extended or adjusted under 35 U.S.C. 154(b) by 171 days.

(21) Appl. No.: 17/606,754

(22) PCT Filed: Oct. 15, 2020

(86) PCT No.: PCT/CN2020/121042
§ 371 (c)(1),
(2) Date: Oct. 26, 2021

(87) PCT Pub. No.: WO2021/103830
PCT Pub. Date: Jun. 3, 2021

(65) Prior Publication Data
US 2022/0216493 A1    Jul. 7, 2022

(30) Foreign Application Priority Data

Nov. 28, 2019  (CN) .......................... 201911186101.1

(51) Int. Cl.
*H01M 8/1004*  (2016.01)
*H01M 4/86*    (2006.01)
(Continued)

(52) U.S. Cl.
CPC ....... *H01M 8/1004* (2013.01); *H01M 4/8828* (2013.01); *H01M 4/926* (2013.01);
(Continued)

(58) Field of Classification Search
None
See application file for complete search history.

(56) References Cited

U.S. PATENT DOCUMENTS

| 2007/0145352 A1* | 6/2007 | Kasama | H01M 8/1048 |
| | | | 549/543 |
| 2008/0176129 A1* | 7/2008 | Lee | H01M 4/926 |
| | | | 252/502 |
| 2009/0117257 A1* | 5/2009 | Monnier | H01M 4/92 |
| | | | 427/113 |
| 2013/0089805 A1 | 4/2013 | Brooker et al. | |

(Continued)

FOREIGN PATENT DOCUMENTS

| CN | 101444728 A | 6/2009 |
| CN | 103765643 A | 4/2014 |

(Continued)

OTHER PUBLICATIONS

CN109167089A—machine translation (Year: 2019).*

*Primary Examiner* — Haroon S. Sheikh
(74) *Attorney, Agent, or Firm* — Bayramoglu Law Offices LLC

(57) ABSTRACT

A membrane electrode with ultra-low oxygen mass transfer resistance includes an anode catalyst layer, a proton exchange membrane (PEM), and a cathode catalyst layer. A catalyst in the cathode catalyst layer is negatively charged, and the cathode catalyst layer is further doped with a negatively charged carbon carrier. A carbon carrier of the cathode catalyst layer in the membrane electrode is negatively charged, thereby optimizing the distribution of ionomers to achieve the purpose of reducing an oxygen mass transfer resistance in the cathode catalyst layer. In addition, an appropriate amount of the negatively charged carbon carrier is doped to increase a local oxygen concentration
(Continued)

near active sites. In conclusion, the two methods of modifying with a negative charge and doping a negatively charged carbon carrier are used to optimize the local mass transfer resistance in an electrode and thus improve the cell performance.

6 Claims, 2 Drawing Sheets

(51) Int. Cl.
*H01M 4/88* (2006.01)
*H01M 4/92* (2006.01)
*H01M 8/10* (2016.01)

(52) U.S. Cl.
CPC ............... *H01M 2004/8689* (2013.01); *H01M 2008/1095* (2013.01)

(56) References Cited

U.S. PATENT DOCUMENTS

| | | | | |
|---|---|---|---|---|
| 2015/0333336 | A1* | 11/2015 | Cho | B01J 23/892 |
| | | | | 977/948 |
| 2017/0244111 | A1* | 8/2017 | Tsuchida | H01M 4/885 |
| 2018/0047984 | A1* | 2/2018 | Kang | H01M 4/587 |

FOREIGN PATENT DOCUMENTS

| | | |
|---|---|---|
| CN | 109103472 A | 12/2018 |
| CN | 109167089 A | 1/2019 |
| CN | 109273748 A | 1/2019 |
| CN | 109390592 A | 2/2019 |
| CN | 109524674 A | 3/2019 |
| CN | 110277565 A | 9/2019 |
| CN | 110739475 A | 1/2020 |
| WO | 2010128737 A1 | 11/2010 |

\* cited by examiner

US 12,057,610 B2

MEMBRANE ELECTRODE WITH ULTRA-LOW OXYGEN MASS TRANSFER RESISTANCE

CROSS REFERENCE TO THE RELATED APPLICATIONS

This application is the national phase entry of International Application No. PCT/CN2020/121042, filed on Oct. 15, 2020, which is based upon and claims priority to Chinese Patent Application No. 201911186101.1, filed on Nov. 28, 2019, the entire contents of which are incorporated herein by reference.

TECHNICAL FIELD

The present invention belongs to the technical field of fuel cells, and more particularly, relates to a membrane electrode with ultra-low oxygen mass transfer resistance.

BACKGROUND

Membrane electrode composed of a cathode, an anode, and a proton exchange membrane (PEM) is an important component of a proton exchange membrane fuel cell (PEMFC). In a cathode catalyst layer, the ionic polymer Nafion and a catalyst form a porous structure, and oxygen passes through pores and the Nafion layer to react on a platinum surface. Therefore, reducing a mass transfer resistance for oxygen in a cathode catalyst layer can reduce the consumption of a platinum catalyst, thereby reducing production cost. At present, a carbon material is usually used as a carrier for a platinum catalyst used in PEMFC, and different catalyst carbon carriers will result in different mass transfer resistances in a catalyst layer. In the prior art, typical carbon carriers are all positively charged on the surface, which leads to a local mass transfer resistance of about 16 $s \cdot cm_{Pt}^{-1}$, thereby causing a cell to undergo a heavy mass transfer polarization loss.

SUMMARY

In view of the defects in the prior art, the present invention provides a membrane electrode with ultra-low oxygen mass transfer resistance through surface modification for a carbon carrier.

The objective of the present invention is achieved by the following technical solutions.

The present invention relates to a membrane electrode with ultra-low oxygen mass transfer resistance, including an anode catalyst layer, a PEM, and a cathode catalyst layer, where a catalyst in the cathode catalyst layer is negatively charged, and the cathode catalyst layer is further doped with a negatively charged carbon carrier.

Further, a catalyst carrier may be a carbon carrier; and the carbon carrier may be negatively charged and then loaded with platinum nanoparticles to obtain a negatively charged platinum-carbon catalyst.

Further, a mass ratio of the platinum to the negatively charged carbon carrier in the negatively charged platinum-carbon catalyst may be 1:1.

Further, the negatively charged carbon carrier may be prepared by subjecting the carbon carrier to a hydrothermal reaction with concentrated sulfuric acid to modify a carbon surface with a sulfate anion.

As a preferred solution, the carbon carrier doped in the catalyst layer may have the same quality and type as the carbon carrier in the platinum-carbon catalyst, and the doped carbon may also be negatively charged. The same material is used to prevent the introduction of other influencing factors through the carbon material.

The above-mentioned negative charge modification to the doped carbon is also achieved by subjecting the carbon carrier to a hydrothermal reaction with concentrated sulfuric acid.

Further, a mass ratio of the carbon carrier to the concentrated sulfuric acid may be 1:3; and the hydrothermal reaction may be conducted at 180° C. for 24 h.

Further, the carbon carrier may include XC-72 and KJ-600.

The present invention also relates to a fabrication method of the membrane electrode with ultra-low oxygen mass transfer resistance, including the following steps:

S1: subjecting a carbon carrier to a hydrothermal reaction with concentrated sulfuric acid to modify a carbon surface with a sulfate anion to obtain a negatively charged carbon carrier;

S2: loading a part of the negatively charged carbon carrier with platinum nanoparticles to obtain a negatively-charged platinum-carbon catalyst;

S3: adding the negatively-charged platinum-carbon catalyst and a Nafion solution (20% by wt.) in a mass ratio of 2:5 to a solvent, adding the negatively charged carbon carrier, and stirring by ball-milling for 10 h to 16 h to obtain a cathode catalyst layer slurry, where a mass ratio of the added negatively charged carbon carrier to the negatively-charged platinum-carbon catalyst is (0.3-0.6):1; and S4: spraying the cathode catalyst layer slurry on one side of a Nafion proton membrane by electrostatic spraying, spraying an anode catalyst layer slurry on the other side of the Nafion proton membrane, and then drying to obtain the membrane electrode including the anode catalyst layer, the PEM, and the cathode catalyst layer.

Further, in S2, the loading of the platinum nanoparticles may specifically include dispersing 2 g of the negatively charged carbon carrier in 200 ml of water, adding 2.5 g of chloroplatinic acid hexahydrate, and performing ultrasonic treatment for 30 min; and adding 6 ml of a 0.5 mol $L^{-1}$ sodium borohydride solution dropwise to reduce the chloroplatinic acid into platinum nanoparticles to obtain the negatively charged platinum-carbon catalyst (with a platinum load of about 50%).

Further, in S3, after the negatively charged platinum-carbon catalyst and the Nafion solution (20% by wt.) are added in a mass ratio of 2:5 to the solvent, a solid content in the solvent may be 0.07% to 1.26%. In addition, if too little carbon is added, a gain effect is not obvious; and if too much carbon is added, the catalyst layer will be thickened and a bulk-phase mass transfer resistance will increase. Therefore, a mass ratio of the negatively charged carbon carrier added to the negatively charged platinum-carbon catalyst should be 0.3 to 0.6.

Further, in S3, the solvent may be a mixed solvent of isopropanol and water.

Further, in S4, the anode catalyst layer may have a Pt load of 0.05 to 0.1 $mg \cdot cm^{-2}$.

Further, in S4, the cathode catalyst layer may have a Pt load of 0.05 to 0.1 $mg \cdot cm^{-2}$.

The present invention realizes the optimization of mass transfer performance of the catalyst layer through a combination of materials with different properties. The present invention focuses on the construction method of the catalyst layer to achieve the improvement of oxygen mass transfer performance. That is, the present invention does not take the membrane electrodesure of improving the catalyst activity, but introduces negative charges and negatively charged carbon particles to improve the oxygen mass transfer performance in the catalyst layer, which is attributed to the construction method of the catalyst layer.

Compared with the prior art, the present invention has the following beneficial effects.

1. In the present invention, a carbon carrier is negatively charged, which can effectively reduce the mass transfer resistance of the catalyst layer; and compared with ordinary positively charged carbon carriers, the catalyst layer of the present invention has more reasonable Nafion distribution, which improves the oxygen mass transfer efficiency.
2. In the present invention, the cathode catalyst layer is additionally doped with a negatively charged carbon carrier, which reduces a unit distribution density of the platinum catalyst while optimizing the Nafion distribution, thereby increasing a local unit concentration of oxygen and reducing the mass transfer polarization of a cell.

BRIEF DESCRIPTION OF THE DRAWINGS

Other features, objectives, and advantages of the present invention will become more apparent by reading the detailed description of non-limiting embodiments with reference to the drawings.

DETAILED DESCRIPTION OF THE EMBODIMENTS

Figure 1:
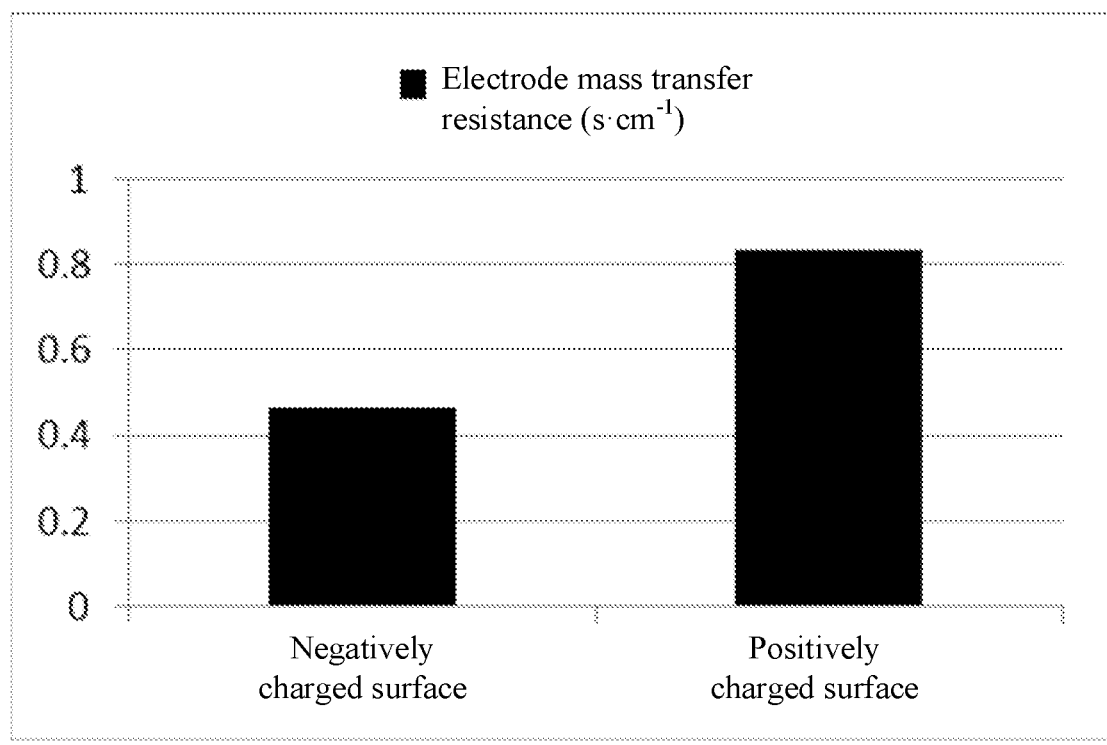
FIG. 1 is a schematic diagram illustrating the overall electrode mass transfer resistances in catalyst layers modified with different charges.

The present invention is described in detail below with reference to the embodiments. The following embodiments will help those skilled in the art to further understand the present invention, but do not limit the present invention in any way. It should be noted that those of ordinary skill in the art can further make several variations and improvements without departing from the idea of the present invention. These all fall within the protection scope of the present invention.

The membrane electrode required by the present invention was fabricated by electrostatic spraying.

A catalyst layer slurry required for the spraying was prepared.

1. Preparation of materials XC-72 carbon was mixed with concentrated sulfuric acid (in a mass ratio 1:3) and reacted at 180° C. for 24 h, such that the carbon was loaded with a negative charge to obtain a negatively charged carbon carrier. 2 g of the negatively charged carbon carrier was dispersed in 200 ml of an aqueous solution, then 2.5 g of chloroplatinic acid hexahydrate was added, ultrasonic treatment was performed for 30 min; and 6 ml of a 0.5 mol $L^{-1}$ sodium borohydride solution was added dropwise to reduce the chloroplatinic acid into platinum nanoparticles to obtain a negatively charged platinum-carbon catalyst.

2. Preparation of membrane electrode 0.062 g of the negatively charged platinum-carbon catalyst and 0.15 g of a commercial ionomer resin Nafion solution with a concentration of 20% were added to 15 ml of a mixed solvent of isopropanol and water (in a volume ratio of 3:1), then 0.031 g of the negatively charged carbon carrier was added, and a resulting slurry was subjected to ball-milling for 24 h and then sprayed on a proton membrane as a cathode.

An anode slurry was prepared from 0.062 g of a commercial 46% platinum-carbon catalyst and 0.15 g of a 20% commercial ionomer resin; and a preparation method was the same as that for the cathode slurry except that no additional carbon carrier was added and a slurry obtained after ball-milling was sprayed on the other side of the proton membrane.

The anode and cathode both had a platinum load of 0.1 mg·$cm^{-2}$.

In the present invention, a mass transfer resistance was tested by the limiting current method at a test temperature of 80° C. and a humidity of 67%. A 1 cm*2 cm 10-channel parallel flow field was used for the test, with test gas volumes: hydrogen: 800 cc/min and 4% oxygen-nitrogen mixed gas: 1,500 cc/min; and a test back pressure: 150 $KPa_{abs}$.

A cell performance test was conducted under the following conditions: temperature: 80° C., humidity: 100%, and test back pressure: 150 $KPa_{abs}$. A flow channel for cell was a 5 cm*5 cm 5-channel snakelike flow field, with a test gas membrane electrodesurement ratio: $H_2$:Air=2:2.

Embodiments 1 to 3

In order to optimize the consumption of the negatively charged carbon carrier, the present invention adopted three embodiments in total, Embodiments 1, 2, and 3. Mass ratios of the doped negatively charged carbon carrier to the negatively charged platinum-carbon catalyst (with a platinum load of about 50%) in Embodiments 1, 2, and 3 were 0.3:1, 0.5:1, and 0.6:1, respectively.

Comparative Examples 1 to 3

Since conventional commercial catalysts generally use carbon carriers such as XC-72 and KJ-600, all of which are positively charged. In the comparative examples of the present invention, a positively charged commercial XC-72 was used to fabricate a catalyst and a membrane electrode. That is, in the comparative examples, a surface of a catalyst carbon carrier or an additionally doped carbon carrier was positively charged. A fabrication method for Comparative Examples 1 to 3 was the same as that for Embodiment 2 except that the carbon carrier and/or doped carbon carrier of the platinum-carbon catalyst used in Comparative Examples 1 to 3 was different from that of Embodiment 2. There were three specific comparative examples:

1. The carbon carrier of the platinum-carbon catalyst in Comparative Example 1 was negatively charged (the same as Embodiment 2), and the doped carbon carrier was positively charged commercial XC-72.
2. The carbon carrier of the platinum-carbon catalyst in Comparative Example 2 was positively charged commercial XC-72, and the doped carbon carrier was negatively charged (the same as Embodiment 2).
3. In Comparative Example 3, both the carbon carrier of the platinum-carbon catalyst and the doped carbon carrier were positively charged commercial XC-72.

Figure 2:
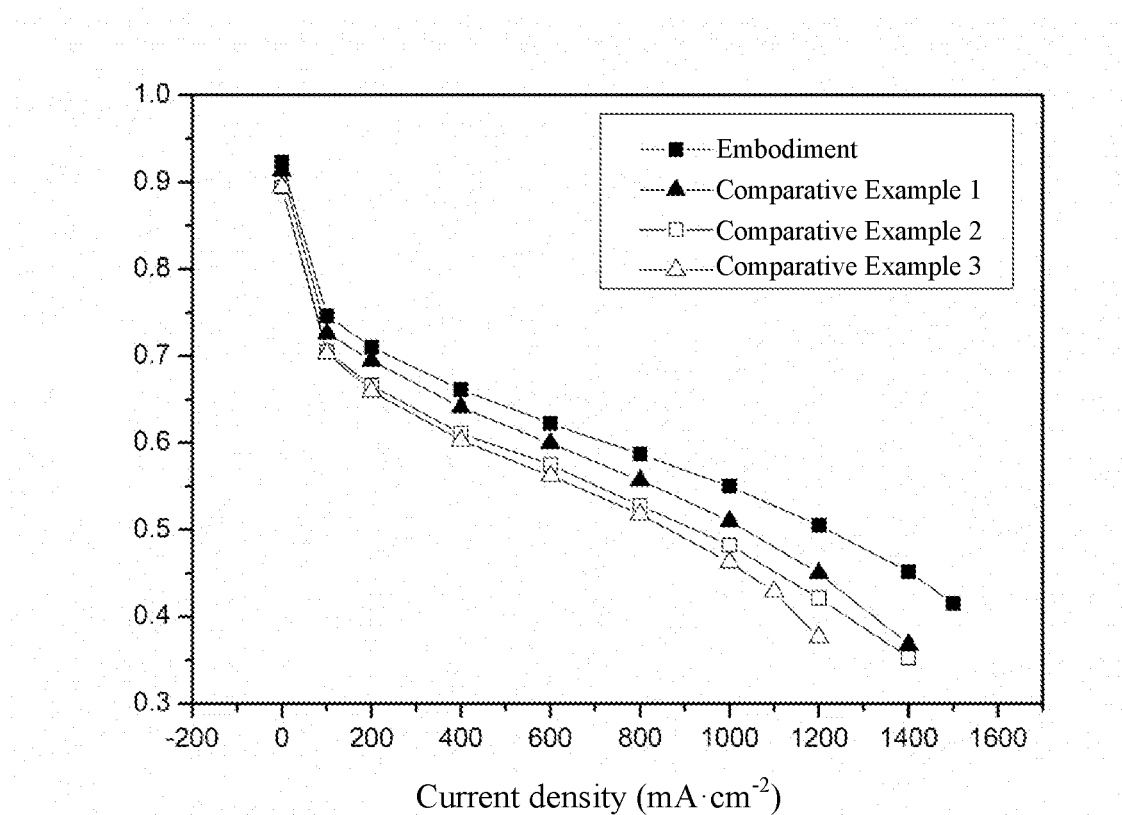
FIG. 2 is a schematic diagram illustrating the air cell performance of catalyst layers modified with different charges.

It can be seen from FIG. 1 that after the negative charge modification, the oxygen mass transfer resistance of the catalyst layer could be halved. It can be seen from FIG. 2 (in FIG. 2, the embodiment refers to Embodiment 2) that, compared with the comparative examples, the embodiment exhibited improved cell performance; and compared with the conventional membrane electrode with all carbon carriers being positively charged (comparative Example 3), the introduction of negative charges significantly improved the cell performance. When both the catalyst carbon carrier and the doped carbon carrier were negatively charged, a performance improvement of about 100 mV could be achieved. In addition, when a current was increased to 1000 mA·cm$^{-2}$, Comparative Example 3 began to be affected by water logging, but the embodiment did not undergo similar conditions. When a surface of a catalyst is negatively charged, an ionomer cannot tightly cover the surface of the catalyst due to electrostatic interaction, which reduces the difficulty of oxygen passing through the ionomer on the surface of the catalyst layer. Added carbon particles increase a distance among active sites and thus increase a local oxygen concentration. The two characteristics can reduce a local mass transfer resistance of the catalyst layer. Therefore, the mass transfer resistance of the catalyst layer of the embodiment is significantly reduced, and the mass transfer polarization loss of a cell is reduced.

Figure 3:
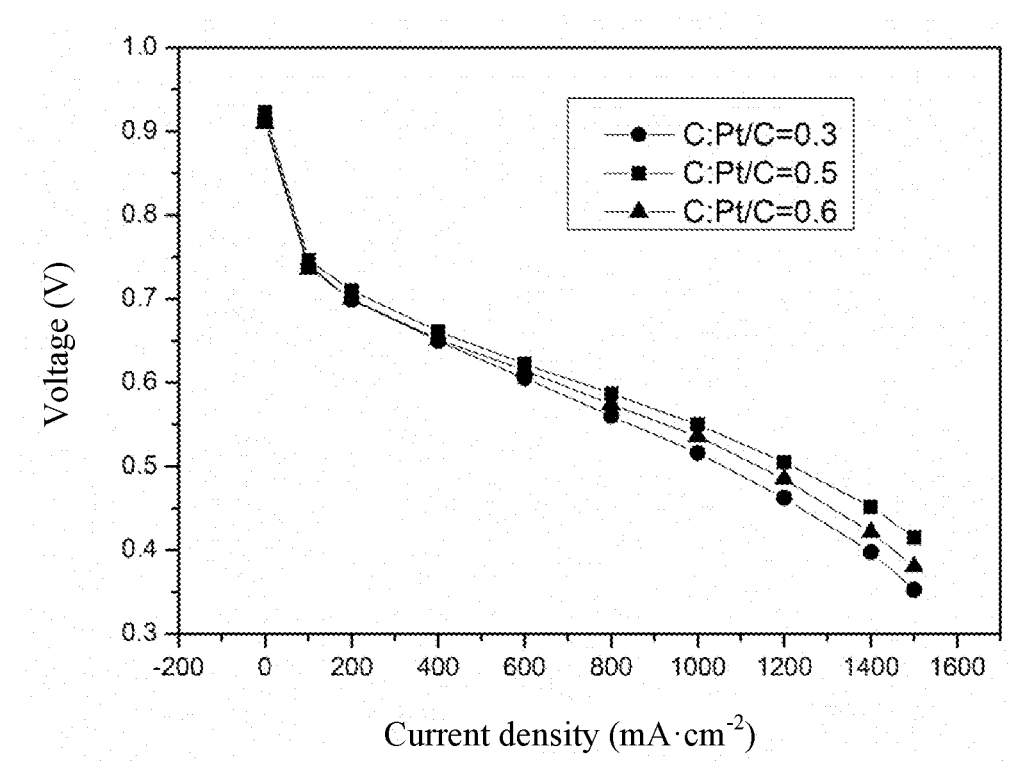
FIG. 3 is a schematic diagram illustrating the air cell performance of the negatively charged catalyst layers in Embodiments 1 to 3.

It can be further seen from the comparison of Embodiments 1 to 3 (FIG. 3) that, when carbon is doped at a small amount (0.3:1), the improvement of the negative charge effect on mass transfer is not maximized; and when a carbon content is high (0.6:1), an electrode thickness increases and thus a bulk-phase mass transfer resistance increases, which counteracts the positive effect of negative charges. Through experiments, it can be known that a reasonable carbon doping ratio is about 0.5:1.

The embodiments of the present invention are described above. It should be understood that the present invention is not limited to the above specific implementations, and a person skilled in the art can make various variations or modifications within the scope of the claims without affecting the essence of the present invention.

What is claimed:

1. A membrane electrode with an oxygen mass transfer resistance below 16 s·cm$_{Pt}^{-1}$, comprising:
   an anode catalyst layer,
   a proton exchange membrane (PEM), and
   a cathode catalyst layer,
   wherein a catalyst in the cathode catalyst layer is negatively charged, and the cathode catalyst layer is first doped with a negatively charged carbon carrier by subjecting a carbon carrier to a hydrothermal reaction with concentrated sulfuric acid to modify a carbon surface with a sulfate anion, then the negatively charged carbon carrier is loaded with platinum nanoparticles to obtain a negatively charged platinum-carbon catalyst, wherein
   a mass ratio of the platinum nanoparticles to the negatively charged carbon carrier in the negatively charged platinum-carbon catalyst is 1:1.

2. The membrane electrode according to claim 1, wherein a mass ratio of the carbon carrier to the concentrated sulfuric acid is 1:3; and the hydrothermal reaction is conducted at 180° C. for 24 h.

3. The membrane electrode according to claim 1, wherein the carbon carrier comprises XC-72 and KJ-600.

4. A fabrication method of the membrane electrode according to claim 1, comprising the following steps:
   S1: subjecting a carbon carrier to a hydrothermal reaction with concentrated sulfuric acid to modify a carbon surface with a sulfate anion to obtain a negatively charged carbon carrier;
   S2: loading a first part of the negatively charged carbon carrier with platinum nanoparticles to obtain a negatively-charged platinum-carbon catalyst;
   S3: adding the negatively-charged platinum-carbon catalyst and a Nafion solution in a mass ratio of 2:5 to a solvent, adding a second part of the negatively charged carbon carrier to the solvent to obtain a mixture, and stirring the mixture by ball-milling for 10 h to 16 h to obtain a cathode catalyst layer slurry, wherein a mass ratio of the second part of the negatively charged carbon carrier to the negatively-charged platinum-carbon catalyst is (0.3-0.6):1; and
   S4: spraying the cathode catalyst layer slurry on a first side of a Nafion proton membrane by electrostatic spraying, spraying an anode catalyst layer slurry on a second side of the Nafion proton membrane, and then drying the Nafion proton membrane to obtain the membrane electrode comprising the anode catalyst layer, the PEM, and the cathode catalyst layer.

5. The fabrication method according to claim 4, wherein in S4, the anode catalyst layer has a Pt load of 0.05 to 0.1 mg·cm$^{-2}$.

6. The fabrication method according to claim 4, wherein in S4, the cathode catalyst layer has a Pt load of 0.05 to 0.1 mg·cm$^{-2}$.

* * * * *